(12) United States Patent
Byun

(10) Patent No.: US 11,379,133 B2
(45) Date of Patent: Jul. 5, 2022

(54) ELECTRONIC DEVICE, DATA STORAGE DEVICE AND METHOD OF OPERATING THEREFOR

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/022,564

(22) Filed: Sep. 16, 2020

(65) Prior Publication Data

US 2021/0326053 A1     Oct. 21, 2021

(30) Foreign Application Priority Data

Apr. 17, 2020   (KR) .................... 10-2020-0046488

(51) Int. Cl.
*G06F 3/06* (2006.01)
*G06F 1/32* (2019.01)
*G06F 1/3296* (2019.01)
*G06F 1/3234* (2019.01)

(52) U.S. Cl.
CPC .......... *G06F 3/0634* (2013.01); *G06F 1/3275* (2013.01); *G06F 1/3296* (2013.01); *G06F 3/0625* (2013.01); *G06F 3/0673* (2013.01)

(58) Field of Classification Search
CPC .... G06F 3/0634; G06F 1/3275; G06F 1/3296; G06F 3/0625; G06F 3/0673
USPC ....................................................... 711/154
See application file for complete search history.

(56) References Cited

U.S. PATENT DOCUMENTS

| | | | | |
|---|---|---|---|---|
| 6,381,204 B1* | 4/2002 | Kobayashi | ........... | G11B 19/125 369/47.3 |
| 6,633,905 B1* | 10/2003 | Anderson | ............. | H04L 67/125 709/219 |
| 7,421,573 B2* | 9/2008 | Kim | .......................... | G06F 8/65 713/1 |
| 8,281,119 B1* | 10/2012 | Spangler | ............... | G06F 9/4401 713/2 |
| 8,898,495 B2* | 11/2014 | Wang | ..................... | G06F 1/3203 713/321 |
| 9,519,302 B2* | 12/2016 | Kim | ....................... | G11C 7/1066 |
| 2008/0034234 A1* | 2/2008 | Shimizu | ................. | G06F 1/3225 713/320 |
| 2008/0126686 A1* | 5/2008 | Sokolov | .............. | G06F 12/0246 711/103 |

(Continued)

FOREIGN PATENT DOCUMENTS

KR   10-1475823   12/2014
KR   10-2018-0032728   4/2018

*Primary Examiner* — Christopher B Shin
(74) *Attorney, Agent, or Firm* — IP & T Group LLP

(57) ABSTRACT

An electronic device may include a plurality of data storage devices including a master storage device and one or more slave storage devices. Each of the data storage devices comprises a storage configured to store data and a controller configured to control data input/output operations with respect to the corresponding storage. The controller of the master storage device receives device information including identification information, capacity information and physical configuration information from each of the slave storage devices, and the controller of the master storage device changes an electric power mode of at least one of the slave storage devices selected based on capacity margin of the master storage device and the device information.

14 Claims, 10 Drawing Sheets

(56) References Cited

U.S. PATENT DOCUMENTS

| | | | | |
|---|---|---|---|---|
| 2010/0070695 A1* | 3/2010 | Baek | ............... | G06F 12/023 |
| | | | | 711/104 |
| 2010/0287391 A1* | 11/2010 | Ochiai | ............... | G06F 13/1668 |
| | | | | 713/320 |
| 2011/0185213 A1* | 7/2011 | Yoshida | ............... | G06F 1/30 |
| | | | | 713/340 |
| 2014/0115360 A1* | 4/2014 | Zhou | ............... | G06F 1/325 |
| | | | | 713/320 |
| 2014/0310698 A1* | 10/2014 | Lee | ............... | G06F 8/654 |
| | | | | 717/168 |
| 2015/0153750 A1* | 6/2015 | Jeon | ............... | G06F 13/382 |
| | | | | 327/543 |
| 2015/0198999 A1* | 7/2015 | Liu | ............... | G06F 9/4418 |
| | | | | 713/323 |
| 2016/0162219 A1* | 6/2016 | Erez | ............... | G11C 8/12 |
| | | | | 711/103 |
| 2016/0179722 A1* | 6/2016 | Nakanishi | ............... | G06F 13/4068 |
| | | | | 710/106 |
| 2016/0188430 A1* | 6/2016 | Nitta | ............... | G06F 11/2094 |
| | | | | 714/6.3 |
| 2016/0378632 A1* | 12/2016 | Srivastava | ............... | G06F 9/4411 |
| | | | | 714/5.1 |
| 2017/0038973 A1* | 2/2017 | Takano | ............... | G06F 3/0655 |
| 2018/0157417 A1* | 6/2018 | Shih | ............... | G06F 3/0634 |
| 2018/0239896 A1* | 8/2018 | Kato | ............... | G06F 9/45558 |
| 2019/0138233 A1* | 5/2019 | Mun | ............... | G06F 3/0679 |
| 2020/0125155 A1* | 4/2020 | Mcdaniel | ............... | G06F 1/30 |
| 2021/0181785 A1* | 6/2021 | Jang | ............... | G06F 1/12 |

* cited by examiner

ELECTRONIC DEVICE, DATA STORAGE DEVICE AND METHOD OF OPERATING THEREFOR

CROSS-REFERENCE TO RELATED APPLICATION

The present application claims priority under 35 U.S.C. § 119(a) to Korean application number 10-2020-0046488, filed on Apr. 17, 2020, in the Korean Intellectual Property Office, which is incorporated herein by reference in its entirety.

BACKGROUND

1. Technical Field

Various embodiments generally relate to a semiconductor integrated device, more particularly, an electronic device, a data storage device, and a method of operating the same.

2. Related Art

A data storage device may be accessed by a host device to perform input/output operations in accordance with requests of the host device.

As industries related to artificial intelligence and big data may have been developed, the amount of data processed by an electronic device using a data storage device as a storage medium has remarkably increased.

In order to process such large amounts of data, capacity of the data storage device of the electronic device may need to be increased.

One way to increase the capacity of a data storage device is to install a plurality of the data storage devices at the host device side.

However, doing so increases electric power consumption in proportion to the number of data storage devices installed at the host device side. Further, when a mobile device, the power supply of which is restricted by the capacity of its battery, the power of the mobile device may need to be managed accordingly.

SUMMARY

In embodiments of the present disclosure, an electronic device may include a plurality of data storage devices including a master storage device and one or more slave storage devices. Each of the data storage devices comprises a storage configured to store data and a controller configured to control data input/output operations with respect to the corresponding storage. The controller of the master storage device receives device information including identification information, capacity information and physical configuration information from each of the slave storage devices, and the controller of the master storage device changes an electric power mode of at least one of the slave storage devices selected based on capacity margin of the master storage device and the device information.

In embodiments of the present disclosure, a data storage device may include a storage configured to store data; a controller configured to control data input/output operations with respect to the storage. The controller comprises a storage device interface configured to receive device information including identification information, capacity information and physical configuration information of one or more other data storage devices; and an electric power manager configured to change an electric power mode of a slave storage device selected among the one or more other data storage devices based on capacity margin of the storage and the device information.

In embodiments of the present disclosure, according to a method of operating a data storage device, the data storage device including a storage configured to store data and controller configured to control data input/output operations with respect to the storage, the method comprising: receiving device information including identification information, capacity information and physical configuration information of one or more other data storage devices; determining capacity margin of the storage; selecting a slave storage device among the one or more other data storage devices based on the capacity margin of the storage and the device information; and changing an electric power mode of the selected slave storage device.

In embodiments of the present disclosure, a system comprising first and second devices. The first device is configured to process a request without the second device or activate the second device to cooperate in processing the request depending on an available capacity of the first device. When the second device is activated, the first device is further configured to transfer the request to the activated second device. The second device is configured as operative upon the activation.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention are described in greater detail with reference to the accompanying drawings. However, the present invention should not be construed as being limited to the particular configurations illustrated herein but may include alternate configurations which do not depart from the spirit and scope of the present invention as defined in the appended claims.

The present invention is also not limited by or to any particular disclosed embodiment nor any particular detail described herein. Although a few embodiments of the present invention are disclosed, it will be appreciated by those of ordinary skill in the art that changes may be made to any of these embodiments without departing from the principles and spirit of the present invention. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Hereinafter, a semiconductor memory device and a method of manufacturing the same in accordance with embodiments are illustrated in detail. In embodiments, a first direction D1 may be an x-direction or a row direction and a second direction D2 may be a y-direction or a column direction substantially perpendicular to the x-direction D1. A third direction D3 may be a z-direction or a vertical direction substantially perpendicular to the first direction D1 and the second direction D2. Alternatively, the first direction D1 may be the y-direction and the second direction D2 may be the x-direction.

Figure 1:
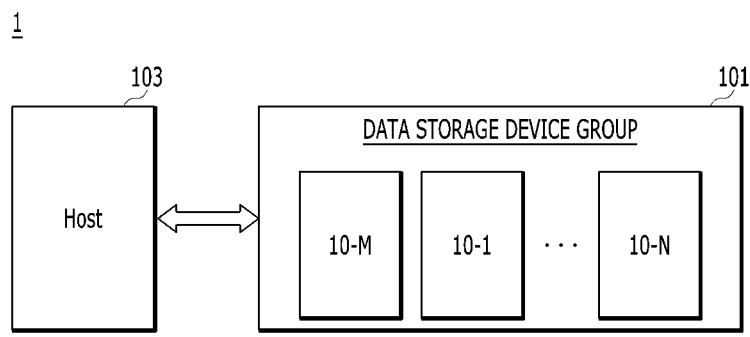
FIG. 1 is a view illustrating an electronic device in accordance with embodiments.

FIG. 1 is a view illustrating an electronic device in accordance with embodiments.

Referring to FIG. 1, an electronic device 1 may include a host 103 and a data storage device group 101 configured to process data in accordance with a request of the host 103.

The host 103 may include a computing device using the data storage device group 101 as a storage medium.

The data storage device group 101 may include a plurality of data storage devices 10-M and 10-1~10-N.

The host 103 may set any one of the data storage devices as a master, storage device 10-M and remaining data storage devices as slave storage devices 10-1~10-N as at least one data storage device 10-x is accessed by the host 103 of the electronic device 1. Thus, the data storage device group 101 may include the master storage device 10-M and the slave storage devices 10-1~10-N.

The host 103 may transmit a read request or a write request to the master storage device 10-M to initiate exchange of associated data between the host 103 and the master storage device 10-M.

In example embodiments, when the data storage devices 10-M and 10-1~10-N are electrically coupled within the electronic device 1 and any one of the data storage devices is set as the master storage device 10-M, the remaining, slave storage devices 10-1~10-N may be configured to transmit device information to the master storage device 10-M.

The master storage device 10-M may interface with the slave storage devices 10-1~10-N to receive the device information including identification information, capacity information, physical configuration information, and the like, of the slave storage devices 10-1~10-N. Further, when an electric power management event is triggered in accordance with a capacity margin of the master storage device 10-M, the master storage device 10-M may manage electric power modes of the slave storage devices 10-1~10-N based on the device information of the slave storage devices 10-1~10-N.

The data storage device 10 may include a plurality of memory blocks including a plurality of pages, at least one plane including the memory blocks, and a plurality of memory dies including the at least one plane. Each of the memory dies may be accessed through a channel and a path (way) branched from the channel. Thus, the physical configuration information of the data storage device 10 may include a channel number, a die number, a plane number with reference to the corresponding die, a memory block number with reference to the corresponding plane, a plane size in the memory block, and the like.

The capacity margin may be determined based on at least one of the number of free blocks, frequency of garbage collection triggered in a set time, speed at which data is input from the host 130 (data input speed) and a life span of the storage 120 in the data storage device 10, i.e., the master storage device 10-M. In embodiments, the life span of the data storage device 10 may be determined by a number of erase cycles, a number of write cycles, or other suitable information.

In example embodiments, when the capacity margin of the master storage device 10-M is not less than a threshold value TH1, the master storage device 10-M may be operated in an active mode to process the request of the host 130 as a storage medium of the electronic device 1. The slave storage devices 10-1~10-N, which is may not be involved in processing the request of the host 103, may be in a power-off state or on standby, or in a lower power mode. The lower power mode may be an idle mode or a sleep mode.

In contrast, when the capacity margin of the master storage device 10-M is below the threshold value TH1, the master storage device 10-M may change at least one of the slave storage devices 10-1~10-N to an active mode to process the request of the host 103. In embodiments, the capacity margin may be subdivided into a plurality of grades. The master storage device 10-M may determine which, and how many, of the slave storage devices 10-1~10-N changed to the active mode based on the grade of the capacity margin and the device information of the slave storage devices 10-1~10-N.

Figure 2:
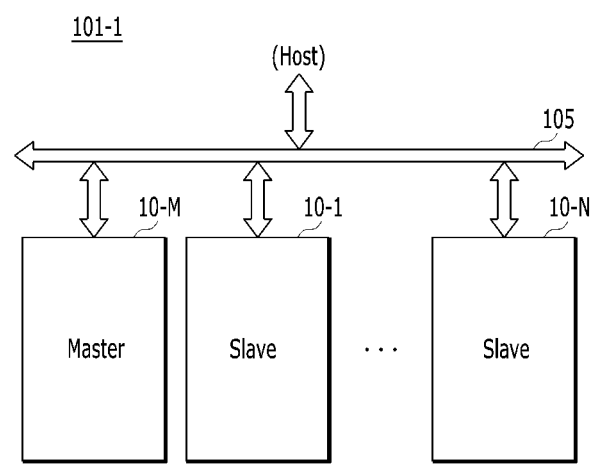
FIGS. 2 to 4 are views illustrating classes of a data storage device group in accordance with embodiments.
Figure 3:
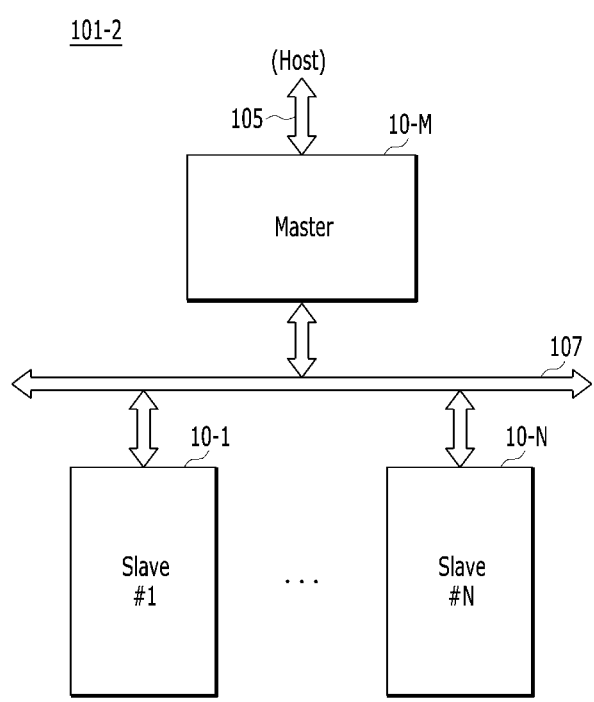
Figure 4:
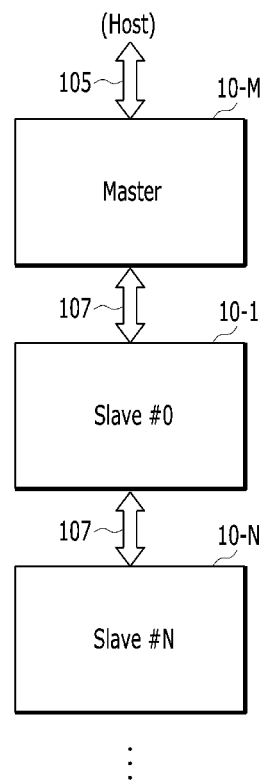

FIGS. 2 to 4 are views illustrating classes of a data storage device group in accordance with embodiments.

Referring to FIG. 2, the data storage devices 10-M and 10-1~10-N in a data storage device group 101-1 may be accessed by each other through a communication channel 105. When the host selects any one of the data storage devices as the master storage device 10-M, the slave storage devices 10-1~10-N recognize the master storage device 10-M as a kind of host to read or write the data in accordance with controls of the master storage device 10-M. The data storage devices 10-M and 10-1~10-N may be directly accessed by the host through the communication channel 105.

Referring to FIG. 3, the host may be directly accessed by the master storage device 10-M in a data storage device group 101-2 through the communication channel 105. The slave storage devices 10-1~10-N may be directly accessed by the master storage device 10-M through a path 107 such as a data bus. In contrast, the slave storage devices 10-1~10-N may be indirectly accessed by the host. In FIG. 3, each of the slave storage devices 10-1~10-N may be controlled by one master storage device 10-M. Thus, the slave storage devices 10-1~10-N recognize the master storage device 10-M as a kind of a host. In embodiments, the slave storage devices 10-1~10-N may be positioned on a class or level logically lower than that of the master storage device 10-M. The slave storage devices 10-1~10-N may be positioned on the same class or level.

Referring to FIG. 4, the host may be directly accessed by the master storage device 10-M in a data storage device group 101-3. At least one slave storage device 10-1 may be accessed by the master storage device 10-M through a path 107 such as a data bus. Each of the other slave storage devices 10-2~10-N may be serially coupled through a path 107 such as a data bus, as shown in FIG. 4.

In embodiments, the slave storage devices 10-1~10-N may have an N-class structure. That is, each slave storage device recognizes the immediate upstream slave storage device in the serial arrangement as a master storage device or host, and is thus operated based on information received therefrom.

The master storage device 10-M may read or write the data in accordance with the request of the host 103. The master storage device 10-M may manage a state of the storage in the master storage device 10-M. When an electric power management event occurs, the master storage device 10-M may change the electric power mode of at least one of the slave storage devices 10-1~10-N.

In embodiments, the electric power management event may be triggered based on the capacity margin of the data storage device 10. Which slave storage devices 10-1~10-N, and how many, are to have their respective electric power modes changed may be selected based on the capacity margin and the device information.

Therefore, when the master storage device 10-M sufficiently processes the request of the host 103 in the active mode, the slave storage devices 10-1~10-N, which may not be involved in processing the request of the host, may be in the power-off mode or the low power mode to prevent electric power from being consumed.

Figure 5:
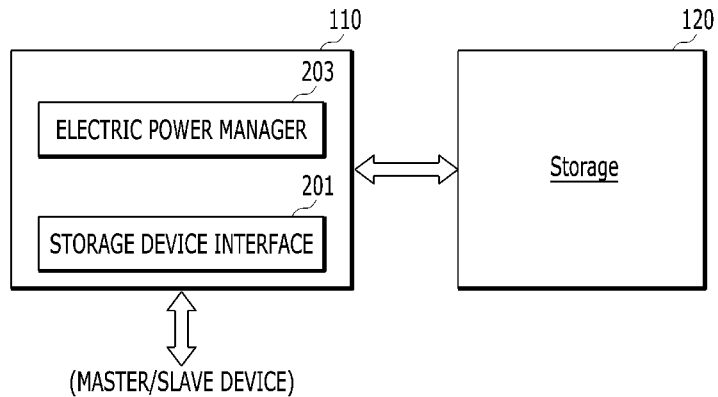
FIG. 5 is a view illustrating a data storage device in accordance with embodiments.

FIG. 5 is a view illustrating a data storage device in accordance with embodiments.

Referring to FIG. 5, a data storage device 10-x of embodiments may include a controller 110 and a storage 120.

The controller 110 may be configured to control the storage 120 in response to the request of the host or, in the case of a slave storage device, the master storage device 10-M. For example, the controller 110 may program data in the storage 120 in accordance with a write request of the host or the master storage device 10-M. The controller 110 may transmit data in the storage 120 to the host 103 or the master storage device 10-M in response to a read request of the host 103 or the master storage device 10-M.

The storage 120 may be configured to record the data or output the data in accordance with the control of the controller 110. The storage 120 may include a volatile memory device or a nonvolatile memory device. In embodiments, the storage 120 may include an electrically erasable and programmable ROM (EEPROM), a NAND flash memory, a NOR flash memory, a phase change RAM (PRAM), a resistive RAM (ReRAM), a ferroelectric RAM (FRAM), and/or a spin torque transfer magnetic RAM (STT-MRAM). The storage 120 may include a plurality of dies, a plurality of chips, and/or a plurality of packages. Further, the storage 120 may operate as a single-level cell (SLC) component in which plural single-level memory cells each store one bit of data, or as a multi-level cell (MLC) component in which plural multiple-level memory cells each store multiple bits of data.

Although not depicted in drawings, a buffer memory may be provided either within or external to the controller 110. The buffer memory may function as a temporary storage device when the data storage device 10 performs any operations including writing or reading the data interlocked with the host 103 or the master storage device 10-M. The buffer memory may be controlled by a buffer memory manager (not shown).

In embodiments, the controller 110 may include a storage device interface 201 and an electric power manager 203.

The storage device interface 201 may provide a communication channel between the data storage devices 10-x.

The storage device interface 201 may provide the master storage device 10-M, as recognized by the storage device interface 201, with the device information including identification (ID) information, capacity information, and physical configuration information. The storage device interface 201 may receive the device information from the master storage device 10-M recognized by the storage device interface 201.

The electric power manager 203 may select at least one of the slave storage devices 10-1~10-N in response to triggering the electric power management event. The electric power manager 203 may control, e.g., change, the electric power mode of the selected slave storage devices 10-1~10-N.

In embodiments, the electric power management event may be triggered in accordance with the capacity margin of the master storage device 10-M. The capacity margin may be determined based on at least one of the number of free blocks, frequency of garbage collection triggered in a set time, speed at which data is input from the host 130 (data input speed) and life span of the storage 120 in the data storage device 10. In embodiments, the capacity margin may be subdivided into a plurality of grades. The master storage device 10-M may determine which storage devices 10-1~10-N, including how many, are changed to the active mode based on the grade of the capacity margin and the device information of the slave storage devices 10-1~10-N.

In embodiments, the different capacity margins are shown in Table 1. Which slave storage devices 10-1~10-N, including how many, to be changed to the active mode may be determined in accordance with the grade of the capacity margin.

TABLE 1

| Capacity Margin | Slave 1 | Slave 2 | Slave 3 | ... | Slave N |
|---|---|---|---|---|---|
| TH2 ≤ LV1 < TH1 | Active | | | | |
| TH3 ≤ LV2 < TH2 | | Active | | | |
| TH4 ≤ LV3 < TH3 | Active | | Active | | |
| ... | ... | ... | ... | ... | |
| LVx < THx | Active | Active | Active | ... | Active |

In Table, the first to x-th threshold values TH1 to THx may be sequentially arranged such that the first threshold value TH1 is greatest and the x-th threshold value THx is smallest (i.e., TH1>TH2>TH3> . . . >THx). When the capacity margin of the master storage device 10-M is equal or greater than a first threshold value TH1, at least the master storage device 10-M may be operated in the active mode to process the request of the host 103. The slave storage devices 10-1~10-N, which may not be involved in processing the request of the host 103, may be in the power-off mode or state or may be operated in the low power mode.

As shown in Table 1, when the capacity margin of the master storage device 10-M is below the first threshold value TH1 and greater than or equal to a second threshold voltage TH2, the master storage device 10-M may change at least one slave storage device, e.g., Slave 1, among the slave storage devices 10-1~10-N to the active mode to process the request of the host 103.

When the capacity margin of the master storage device 10-M is less than the second threshold value TH2 and greater than or equal to a third threshold voltage TH3, the master storage device 10-M may change at least one slave storage device, e.g., Slave 2, among the slave storage devices 10-1~10-N to the active mode to process the request of the host 103.

When the capacity margin of the master storage device 10-M is less than the third threshold value TH3 and greater than or equal to a fourth threshold voltage TH4, the master storage device 10-M may change at least one slave storage device, e.g., Slave 1 or 3, among the slave storage devices 10-1~10-N to the active mode to process the request of the host 103.

When the capacity margin of the master storage device 10-M is below an xth threshold value THx, the master storage device 10-M may change all slave storage devices Slave 1 thru N, i.e., the slave storage devices 10-1~10-N, to the active mode to process the request of the host 103.

Figure 6:
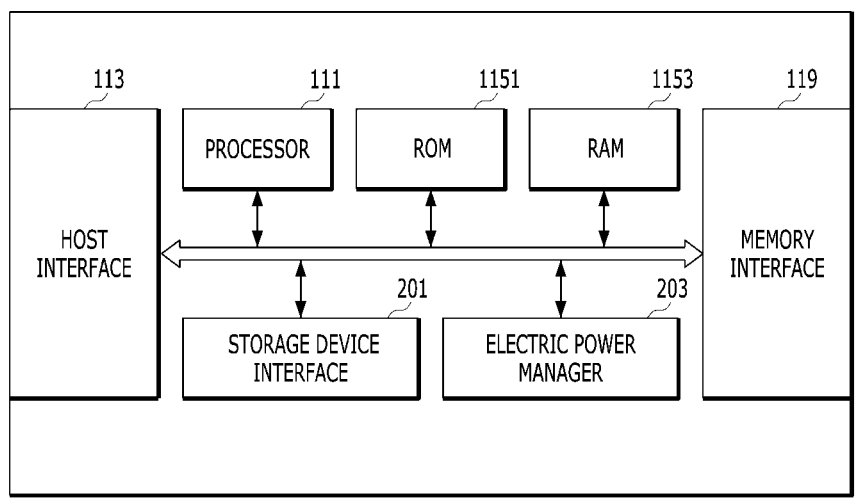
FIG. 6 is a view illustrating a controller in accordance with embodiments.

FIG. 6 is a view illustrating a controller in accordance with embodiments.

Referring to FIG. 6, the controller 110 may include a processor 111, a host interface 113, a ROM 1151, a RAM 1153, a memory interface 119, the storage device interface 201 and the electric power manager 203.

The processor 111 may provide the host interface 113, the memory interface 119, the storage device interface 201 and the electric power manager 203 with various control information used for reading or writing of data with respect to the storage 120. In embodiments, the processor 111 may be operated in accordance with firmware provided for various operations of the data storage device 10. In embodiments, the processor 111 may perform garbage collection, address mapping using a flash translation layer (FTL), and/or wear leveling for managing the storage 120.

The host interface 113 may receive a command and a clock signal from the host device in accordance with the controls of the processor 111. The host interface 113 may provide a communication channel for controlling input/ output of data. Particularly, the host interface 113 may provide a physical connection between the host device and the data storage device 10. The host interface 113 may interface with the data storage device 10 corresponding to a bus format of the host device. The bus format of the host device may be any of various standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI Express (PCI-e or PCIe), and/or a universal flash storage (UFS).

The ROM 1151 may store program codes used for operating the controller 110, for example, firmware, software, and code data used by the program codes.

The RAM 1153 may store data used for operating the controller 110 or data generated by the controller 110.

The memory interface 119 may provide a communication channel through which signals may be transmitted between the controller 110 and the storage 120. The memory interface 119 may write data in the storage 120 in accordance with the controls of the processor 111. The memory interface 119 may transmit the data read from the storage 120 to the host through the host interface 113.

The storage device interface 201 may provide the communication channel between the data storage devices 10-x.

As mentioned above, the data storage device groups 101, 101-1, 101-2 and 101-3 may include the master storage device 10-M and the slave storage devices 10-1~10-N. The master storage device 10-M and the slave storage devices 10-1~10-N may be directly accessed by the host 103 through the communication channel 105 as shown in FIG. 2. The slave storage devices 10-1~10-N may recognize the master storage device 10-M as their host.

Alternatively, the master storage device 10-M may be directly accessed by the host 103 through the communication channel 105 as shown in FIG. 3. In the arrangement, of FIG. 3, each of the slave storage devices 10-1~10-N may directly access the master storage device 10-M through the path 107, e.g., data bus, to recognize the master storage device 10-M as the host.

Further, the master storage device 10-M may be directly accessed by the host 103 through the communication channel 105. The slave storage devices 10-1~10-N may have the N-class structure in which each may be accessed by any other through the path 107, e.g., data bus. That is, as shown in FIG. 4, any one of the slave storage devices 10-1~10-N may recognize another one of the slave storage devices 10-1~10-N as a master storage device or host and operate according to its control.

The storage device interface 201 may provide the master storage device 10-M recognized by the storage device interface 201 with the device information including the ID information, the capacity information, and the like. The storage device interface 201 may receive the device information including the identification (ID) information, the capacity information, and the like, from the master storage device 10-M recognized by the storage device interface 201.

The electric power manager 203 may change at least one of the slave storage devices 10-1~10-N by triggering the electric power management event.

Figure 7:
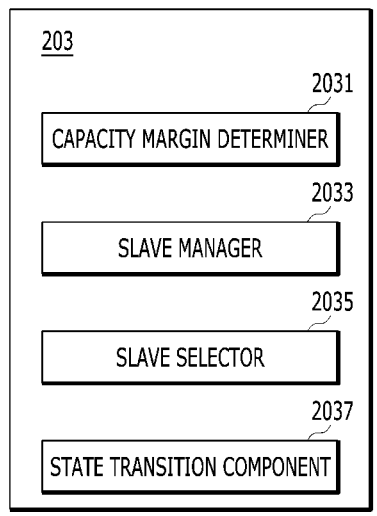
FIG. 7 is a view illustrating an electric power manager in accordance with an embodiment.

FIG. 7 is a view illustrating the electric power manager 203 in accordance with embodiments.

Referring to FIG. 7, the electric power manager 203 may include a capacity margin determiner 2031, a slave manager 2033, a slave selector 2035 and a state transition component 2037.

The capacity margin determiner 2031 may compare the capacity margin with the threshold value TH1 to trigger the electric power management event.

The capacity margin may be determined based on at least one of the number of the free blocks of the memory device in the storage 120, the frequency of garbage collection triggered in a set time, the data input speed and the life span. In embodiments, the life span may be determined by a number of erase cycles, a number of write cycles, or other suitable life span indicator.

In embodiments, the capacity margin may be any one of multiple grades LV1~LVx. The capacity margin determiner 2031 may determine the capacity margin based on the threshold values TH1~THx.

The slave manager 2033 may receive the device information including the ID, the capacity, the physical configuration, and the like, of each of the slave storage devices 10-1~10-N. The physical configuration information of each of the slave storage devices 10-1~10-N may include the channel number, the path number, the die number, the plane number with reference to the associated die, the memory block number with reference to the associated plane, the page size in the memory block, and the like.

The slave selector 2035 may select, based on information such as that in Table 1, at least one slave storage device 10-1~10-N for processing the request of the host in response to triggering the electric power management event by the capacity margin determiner 2031. In embodiments, the slave selector 2035 may determine, based on information such as that in Table 1, at least one of the slave storage devices 10-1~10-N, which is to be changed to the active mode for processing the request of the host, in accordance with the capacity margin or the margin grade of the master storage device 10-M.

The state transition component 2037 may request an electric power mode change to the slave storage device(s) 10-1~10-N selected by the slave selector 2035. Thus, the slave storage devices 10-1~10-N in the power-off state or the low power mode (power-down mode, sleep mode) may be changed to the active mode.

When the capacity margin is same or greater than the threshold value TH1, the storage device may be operated in the active mode to process the request of the host 103. The slave storage devices 10-1~10-N, which may not be involved in the processing the request of the host 103, may be in the power-off state or may be operated in the low power mode. The low power mode may correspond to the idle mode or the sleep mode.

When the capacity margin of the storage device is below the threshold value TH1, as determined by the capacity margin determiner 2031, the electric power management event may be triggered.

The slave selector 2035 may select at least one of the slave storage devices 10-1~10-N based on the device information collected by the s slave manager 2033 and the capacity margin of the storage device. The state transition component 2037 may request that electric power be changed in the selected slave storage device(s) 10-1~10-N so that the corresponding slave storage device(s) 10-1~10-N are changed to the active mode.

Figure 8:
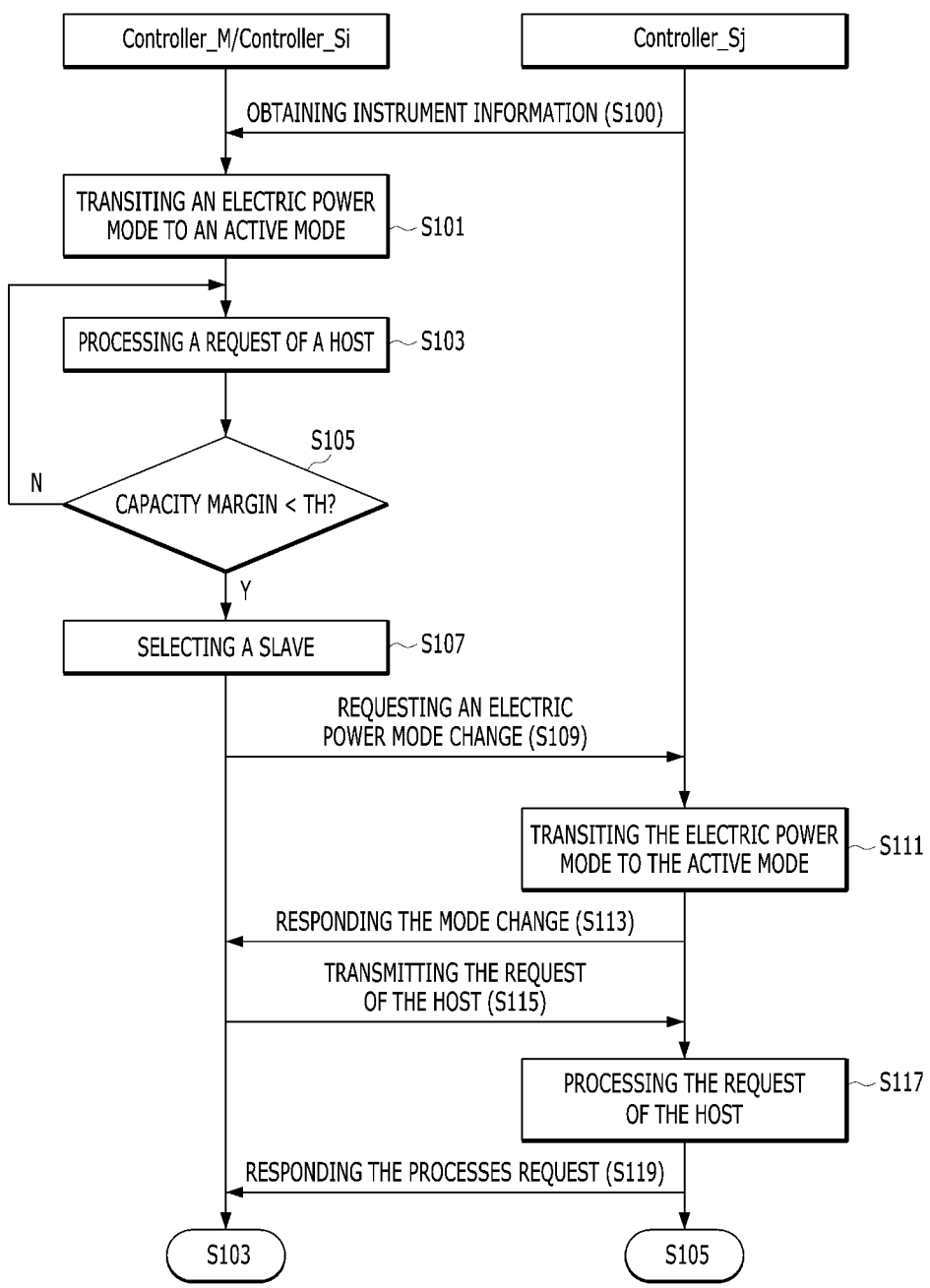
FIG. 8 is a flow chart illustrating a method of operating a data storage device in accordance with an embodiment.

FIG. 8 is a flow chart illustrating a method of operating a data storage device in accordance with embodiments.

When the data storage device group 101 may be installed at the electronic device 1, any one of the data storage devices may be selected as the master storage device 10-M and remaining data storage device may be selected as the slave storage device 10-S.

Referring to FIG. 8, in operation S100, a master controller Controller_M of the master storage device 10-M and a controller Controller_Si of the slave storage device 10-i operating as a master device with respect to the remaining slave storage devices 10-1~10-N may receive device information from the slave storage devices 10-1~10-N. FIG. 8 shows Controller_Sj of a slave storage device 10-j among the remaining slave storage devices 10-1~10-N.

In operations S101 and S103, in order to process the request of the host 103, the master storage device 10-M or the slave storage device 10-i operated with the master storage device 10-M may be changed to the active mode to process the request of the host 103. The active data storage device for processing the request of the host 103 may be referred to as the active storage device.

In operation S105, the controller Controller_M or Controller_Si of the active storage device may determine the capacity margin in accordance with the set time. When the capacity margin is greater than the threshold value TH1, the active storage device may continue to process the request of the host 103.

In contrast, when the capacity margin is less than the threshold value TH1, the controller Controller_M or Controller_Si of the active storage device may select at least one slave storage device 10-j based on the capacity margin of the active storage device and the device information obtained in operation S100 in operation S107.

In embodiments, the capacity margin may be classified as one of multiple grades. The capacity margin determiner 2031 may determine the capacity margin of the active storage device based on the threshold values TH1~THx with respect to the margin grades LV1~LVx.

In operation S109, the controller Controller_M or Controller_Si of the active storage device may request the electric power mode change to the controller Controller_Sj of the selected slave storage device 10-j. In operation S111, the slave storage device 10-j may then be changed to the active mode. In operation S113, the change of the electric power mode may be sent to the controller Controller_M or Controller_Si of the active storage device, which requested the electric power mode change.

In operation S115, because the slave storage device 10-j may be in state for processing the request of the host, the controller Controller_M or Controller_Si of the active storage device may transmit the request of the host to the slave storage device 10-j.

In operation S117, the slave storage device 10-j may process the request of the host. In operation S119, the slave storage device 10-j may transmit process results to the controller Controller_M or Controller_Si of the active storage device. In operation S108, the active storage device 10-M or 10-i may continue to process the request of the host.

Therefore, the slave storage device 10-j may be changed to the active mode to be operated as the active storage device. The controller Controller_Sj of the slave storage device 10-j may become the controller Controller_Si of the active storage device (i.e., the slave storage device 10-j) and thus may manage the electric power modes of remaining slave storage devices 10-1~10-N in accordance with the capacity margin of the slave storage device 10-j.

According to embodiments, the master storage device may change one or more slave storage devices in the data storage device 101 to the active mode in accordance with the capacity margin to process the request of the host. Thus, because the slave storage device(s) that are changed to active mode may be on standby or in the power-off or low power mode before processing the request of the host, the power consumption of the electronic device 1 may be reduced or minimized.

Figure 9:
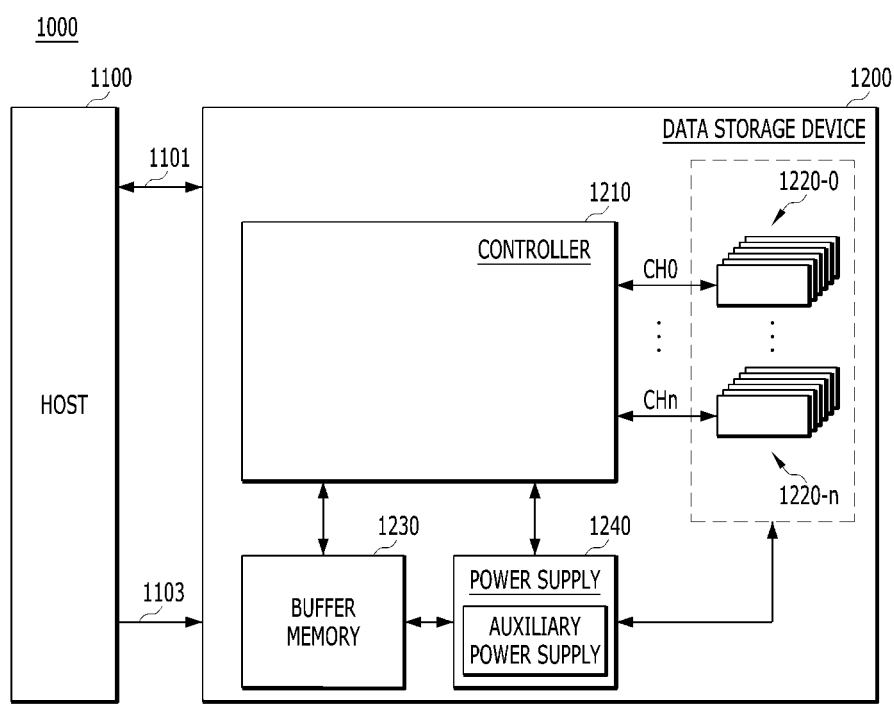
FIG. 9 is a diagram illustrating a data storage system in accordance with an embodiment.

FIG. 9 is a diagram illustrating a data storage system 1000, in accordance with an embodiment.

Referring to FIG. 9, the data storage system 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operation of the data storage device 1200. The controller 1210 may include a host interface, a control component, a random access memory used as a working memory, an error correction code (ECC) component, and a memory interface. In an embodiment, the controller 1210 may configured as controller 110 shown in FIGS. 1 and 2.

The host device 1100 may exchange signals with the data storage device 1200 through the signal connector 1101. The signals may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
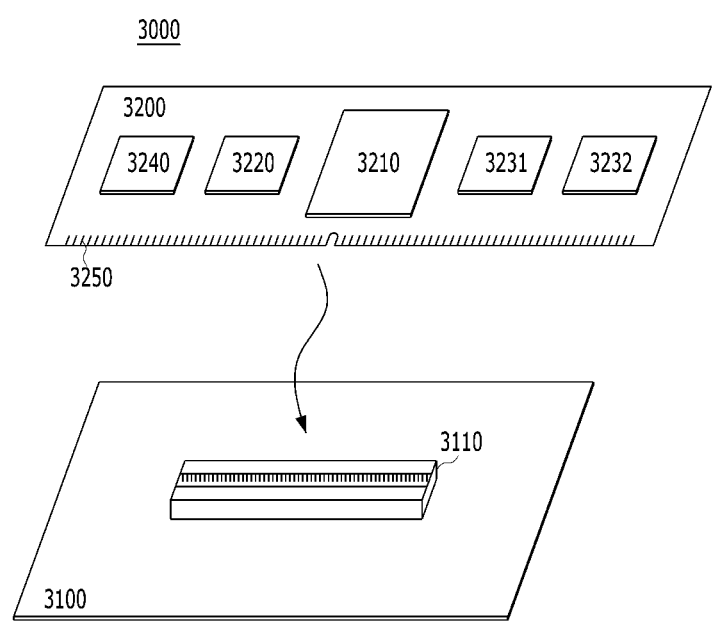
FIG. 10 and FIG. 11 are diagrams illustrating a data processing system in accordance with an embodiment.

FIG. 10 is a diagram illustrating a data processing system 3000, in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operation of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
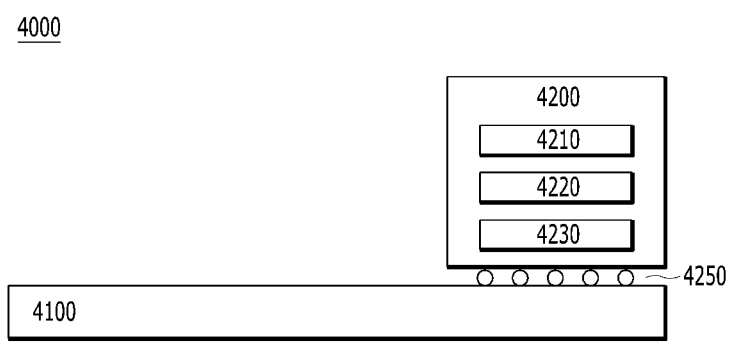

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operation of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
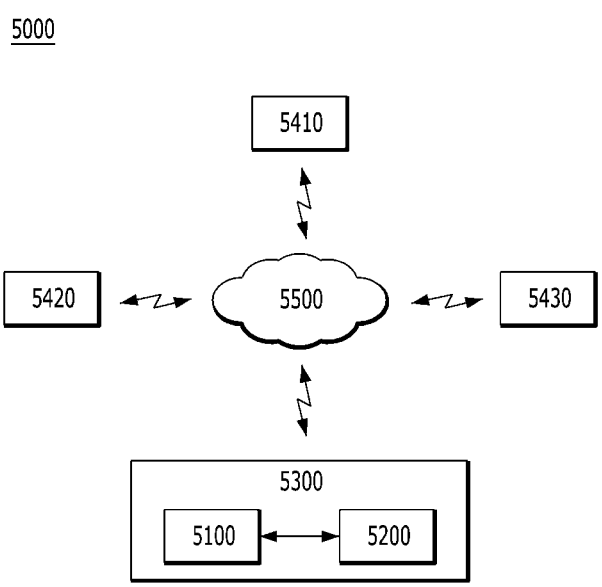
FIG. 12 is a diagram illustrating a network system including a data storage device in accordance with an embodiment.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11.

Figure 13:
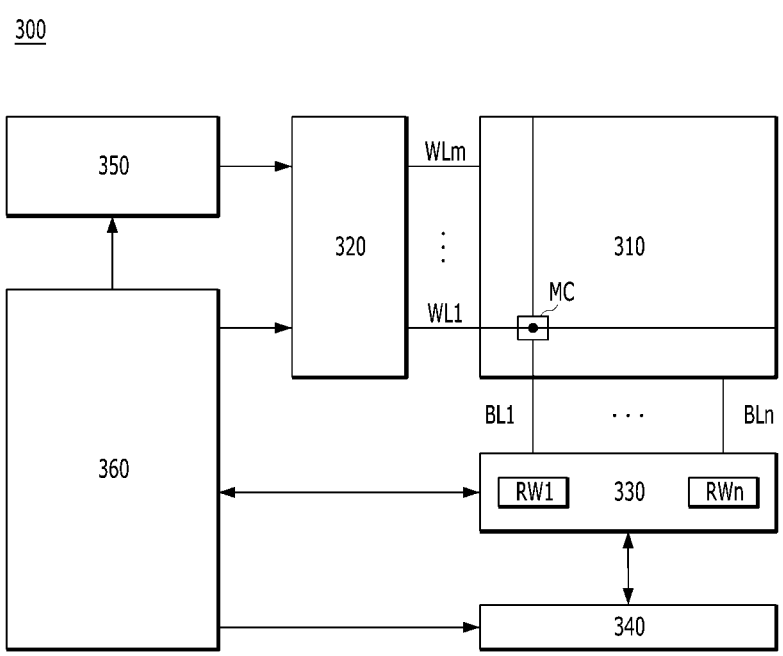
FIG. 13 is a block diagram illustrating a nonvolatile memory device included in a data storage device in accordance with an embodiment.

FIG. 13 is a block diagram illustrating a nonvolatile memory device 300 included in a data storage device, such as the data storage device 10, in accordance with an embodiment. Referring to FIG. 13, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending in a perpendicular direction to the flat surface of a semiconductor substrate. Moreover, the three-dimensional memory array means a structure including NAND strings, memory cells of which are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operation of the nonvolatile memory device 300, based on control signals provided by the external device. For example, the control logic 360 may control operations of the nonvolatile memory device 300 such as read, write, and erase operations of the nonvolatile memory device 300.

The disclosed embodiments of the present invention are intended as examples, not to limit the present invention. Various alternatives and equivalents are possible. The invention is not limited by any of the embodiments described herein. Nor is the invention limited to any specific type of semiconductor device. Those skilled in the art will understand, in view of the present disclosure, that additions, subtractions, and/or modifications may be made, all of which are intended to fall within the scope of the appended claims.

What is claimed is:

1. An electronic device comprising:
a data storage device group, including a plurality of data storage devices, wherein the data storage devices function as a storage medium for a host device,
wherein each of the data storage devices comprises a) a memory device configured to store data and b) a controller configured to control data input/output operations with respect to the memory device,
wherein a first controller of a first data storage device receives device information including identification information, capacity information and physical configuration information from a storage group comprising remaining data storage devices other than the first data storage device, and the first controller of the first data storage device changes an electric power mode of one or more selected data storage devices based on a) a first capacity margin, which is remaining storage capacity of the first data storage device and b) the device information of the data storage devices comprised in the storage group,
wherein the first controller and the selected data storage device are in data communication with each other, and
wherein the first controller is configured to decide the selected data storage devices when the first capacity margin of the first data storage device is not less than a preset threshold value.

2. The electronic device of claim 1, wherein the first controller of the first data storage device determines the first capacity margin based in part on at least a number of free blocks in a first memory device included in the first data storage device, a frequency of garbage collection triggered in a set time, a speed at which data is input from the host device and a life span of the first memory device.

3. The electronic device of claim 1, wherein the first controller of the first data storage device changes the electric power mode of the selected data storage device to an active mode.

4. The electronic device of claim 3, wherein the electric power mode of the selected data storage device is changed from a power-off mode or a low power mode to the active mode.

5. The electronic device of claim 3, wherein the first data storage device and the selected data storage device changed to the active mode comprises an active data storage device, and electric power modes of each one or more data storage devices that was not changed to the active mode are controlled based on a) a resultant capacity margin of the active storage device and b) the device information of each of the one or more data storage devices other than the active storage device.

6. The electronic device of claim 1, wherein the first capacity margin is subdivided into a plurality of grades, and the first controller of the first data storage device determines the first capacity margin as one of the grades.

7. A data storage device comprising:
a memory device configured to store data;
a controller of the memory device configured to control data input/output operations to the memory device,
wherein the controller comprises:
a storage device interface configured to receive device information including identification information, capacity information and physical configuration information from a storage group comprising one or more other data storage devices; and
an electric power manager configured to change an electric power mode of a selected data storage device selected among the storage group based on a) a first capacity margin, which is a remaining storage capacity of the memory device, and b) the device information of each of the one or more data storage devices comprised in the storage group,
wherein the controller and the storage group are in data communication with each other, and
wherein the controller is configured to decide the selected data storage device when the first capacity margin of the memory device is not less than a preset threshold value.

8. The data storage device of claim 7, wherein the controller determines the capacity margin based in part on at least a number of free blocks in the memory device, a frequency of garbage collection triggered in a set time, a speed at which data is input from a host and a life span of the memory device.

9. The data storage device of claim 7, wherein the controller changes the electric power mode of the selected data storage device to an active mode.

10. The data storage device of claim 7, wherein the first capacity margin is subdivided into a plurality of grades, and the controller determines the first capacity margin as one of the grades based on threshold values.

11. A method of operating a data storage device, the data storage device including a) a memory device configured to store data and b) a controller configured to control data input/output operations to the memory device, the method comprising:
receiving, by the controller, device information including identification information, capacity information and physical configuration information of a storage group comprising one or more other data storage devices;
determining, by the controller, a first capacity margin of the memory device;
selecting, by the controller, a selected storage device among the one or more other data storage devices comprised in the storage group based on a) the first capacity margin of the memory device, which is a remaining storage capacity of the memory device, and b) the device information of the one or more other data storage devices comprised in the storage group; and
changing, by the controller, an electric power mode of the selected data storage device,
wherein the controller and the storage group are in data communication with each other, and
wherein the controller is configured to decide the selected data storage device when the first capacity margin of the first memory device is not less than a preset threshold value.

12. The method of claim 11, wherein the first capacity margin is determined based in part on at least a number of free blocks in the memory device, a frequency of garbage collection triggered in a set time, a speed at which data is input from a host and a life span of the memory device.

13. The method of claim 11, wherein the first capacity margin is subdivided into a plurality of grades, and the first capacity margin is determined as one of the grades based on threshold values.

14. The method of claim 11, wherein changing the electric power mode comprises changing the electric power mode of the selected data storage device to an active mode.

* * * * *